United States Patent Office 3,209,225
Patented Sept. 28, 1965

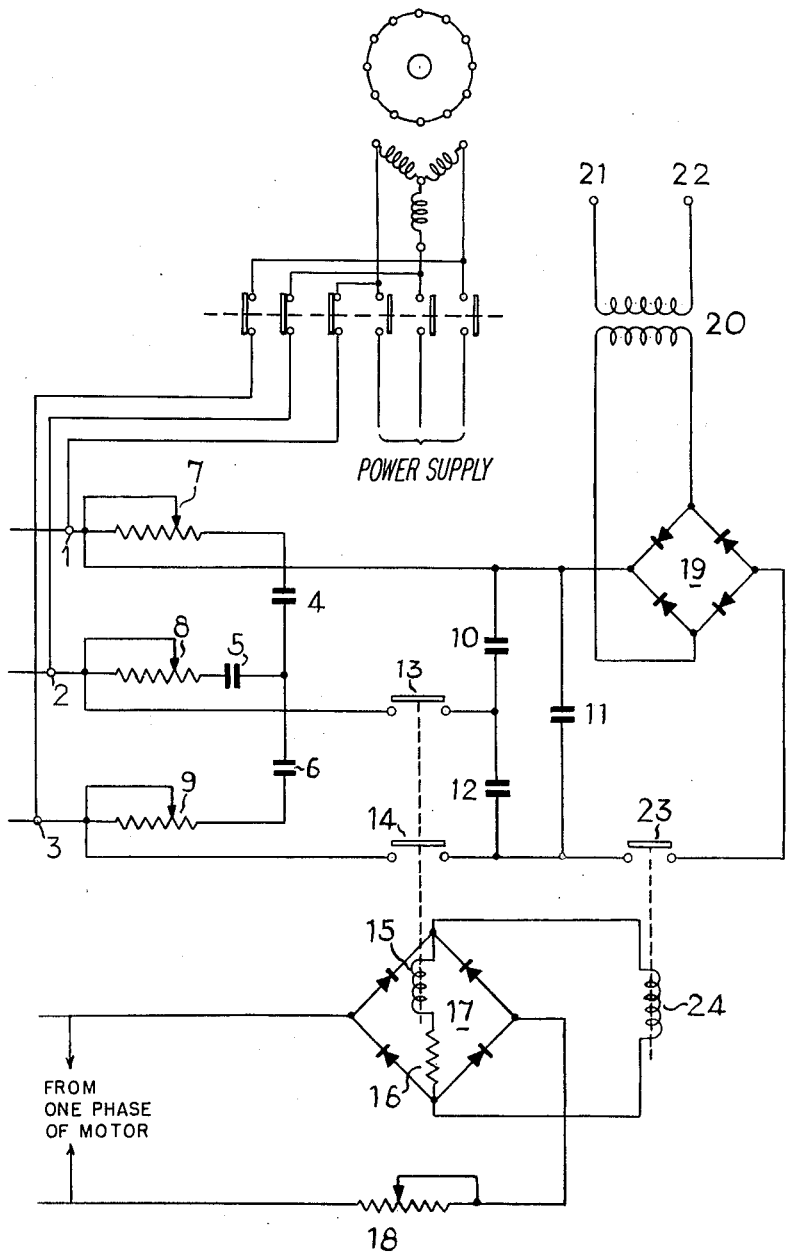

3,209,225
CIRCUIT ARRANGEMENT FOR BRAKING A.C. MOTORS
Shafi-Uddin Ahmed Choudhury, Rugby, England, assignor to Associated Electrical Industries Limited, London, England, a British company
Filed Dec. 21, 1962, Ser. No. 246,431
Claims priority, application Great Britain, Jan. 15, 1962, 1,435/62
1 Claim. (Cl. 318—212)

This invention relates to the braking of A.C. motors with the aid of capacitors, which are connected to the motors after their disconnection from a supply source, and aims at enhancing the braking effect, particularly on motors which are designed to be normally supplied with current of a frequency substantially higher than commercial frequency.

It has been found that a braking arrangement, using capacitors, as described for instance in United States Patent No. 2,929,977 and patent application No. 135,492, still produces a useful braking torque, when the motor is braked to a speed corresponding to say 8 cycles per second, from a normal speed corresponding to 50 cycles per second.

However, the current flowing through a given capacitance depends upon the frequency and decreases as the frequency decreases with the motor speed, while the braking effect depends upon the relationship between the instantaneous inherent reactance of the motor and the capacitive reactance afforded by an external circuit.

With motors designed to run normally at a frequency higher than the usual commercial frequency, which is between 50 and 60 cycles per second, it has been found that towards the end of the braking period the braking torque should be higher than can be afforded by an external circuit used up to now, such as has been mentioned before. The present invention aims at increasing the final braking effect, as compared with said known means. Its effect becomes the more advantageous the higher the frequency for which the motor is designed. It is very pronounced with motors supplied normally at a frequency in the region of 200 cycles per second, or higher, but in individual circumstances the invention may serve also where a motor is designed to run at a lower or normal commercial frequency.

Accordingly this invention resides in a braking circuit arrangement for A.C. motors comprising a capacitance connected to the motor, and a means for automatically applying a direct current to the windings of the motor as well as increasing automatically the capacitance in response to a predetermined decrease in motor voltage during the braking period.

Where the motor is of the three-phase type, the external circuit may comprise delta or star-connected capacitor banks, preferably star-connected capacitor elements or banks for the initial braking period and delta connected capacitor elements or banks which are added towards the end of the braking period. Capacitor elements of the same dielectric strength withstand higher voltages when connected in star. Thus, elements which may or may not have similar manufacturing characteristics can be used in the star and delta connection circuit portions for reasons of economy.

More details will become apparent and the invention will be better understood from the single figure of the accompanying drawing which shows diagrammatically and by way of example a circuit arrangement embodying the invention.

Terminals 1, 2, 3 may form part of a contactor (not shown), as known per se, which is arranged to connect the circuit of a three-phase motor, particularly of the induction type, to a capacitive external circuit, after the motor has been disconnected from a normal A.C. supply. Such a contactor may be operated by push-buttons, or by a relay energised through an automatic control, provided for instance, by limit switches, where the motor forms part of a mine winder. A first external circuit portion comprises capacitors 4, 5, 6 in star arrangement, each individually connected to one of the three phases represented by the three terminals 1, 2, 3. Adjustably variable resistors 7, 8, 9 are connected in series with the capacitors, and it will be understood that the resistors permit adjustment of the rate of deceleration. A second external circuit portion comprises capacitors 10, 11, 12 in delta arrangement. The connection of the additional, or second circuit portion to the motor terminals 1, 2, 3 in parallel to the first circuit portion is controlled by contacts 13, 14, which are operated by a voltage responsive D.C. relay, represented by a coil 15 connected in series with a resistor 16 across a rectifier bridge 17, which is supplied through a variable resistor 18 from one phase of the motor. Contacts 13, 14 remain open until the terminal voltage of the motor drops to a predetermined value as the motor is decelerated. As contacts 13, 14 close the additional capacitance provided by capacitors 10, 11, 12 increases the total capacitive microfarad value of the external circuit, whereby to increase the instantaneous braking torque. Adjustment of the resistor 18 permits to set the point in the deceleration period at which the capacitive value in the circuit connected to the motor is increased.

A direct current source provided by a rectifier bridge 19 supplied through a transformer 20, which may be connected by terminals 21, 22 to one of the phases of a source supplying the motor is connectible through a switch 23 to terminals 1, 3 of the motor. Switch 23 is operated by a coil 24 which is connected to the output of bridge 17, the arrangement being such that coil 24 is energised to hold switch 23 open. When the voltage output from bridge 17 decreases still further after contacts 13, 14 have been closed, switch 23 closes to inject direct current.

Variations are possible without departing from the invention. More than two stages of successively increasing capacitance can be provided. During the last stage of braking the motor may be short-circuited, preferably through resistors, instead of or before being connected to a D.C. source. However, motors operating normally at a high frequency, have at a low speed a low ratio of inherent reactance-to-resistance which tends to make D.C. current energisation more effective for braking than short-circuiting of the motor through external resistors. The use of the invention for motors normally supplied with low frequency or commercial frequency current is advantageous particularly where their internal resistance-to-reactance ratio is higher than usual, or when the resistance of the external circuit, such as the cable resistance between the motor and the braking circuit, is high.

If it is desired to reduce the motor speed without stopping the motor, the final D.C. or short-circuiting braking stage can be omitted, while a means is provided for open circuiting the final capacitor braking stage when the required low speed has been reached.

What I claim is:
A dynamic braking circuit comprising a polyphase induction motor having a rotor and stator windings, a first set of capacitors, a second set of capacitors, a source of alternating current supply, a switch alternatively connecting the supply and the first set of capacitors across the stator windings, said capacitors when connected to the motor applying a braking torque thereto, a relay having a coil energized from one phase of the motor, the contacts of said relay, when energized, connecting the second set of capacitors to the windings, thereby increasing the instantaneous braking torque on the motor, and, furthermore, a direct current supply and additional relay means for connecting said direct current supply to the windings of the motor, said additional relay means having its coil in parallel with the coil of the first relay.

References Cited by the Examiner

UNITED STATES PATENTS

| | | | |
|---|---|---|---|
| 2,445,430 | 7/48 | Herchenroeder et al. | 318—212 |
| 2,858,494 | 10/58 | Choudhury | 318—212 |
| 2,929,977 | 3/60 | Choudhury | 318—212 |
| 2,973,467 | 2/61 | Choudhury et al. | 318—211 |

ORIS L. RADER, *Primary Examiner.*